Dec. 19, 1967     N. J. HUGHES     3,358,728
PRONGED NUT
Filed March 3, 1966
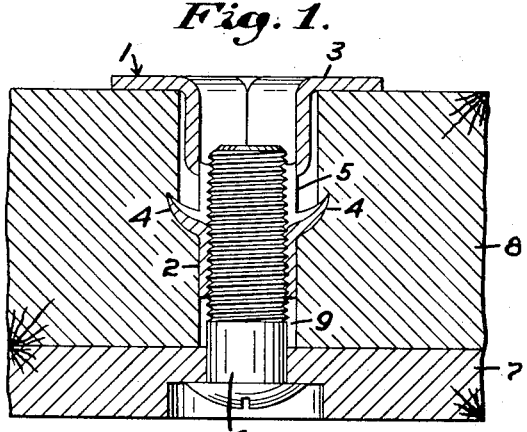
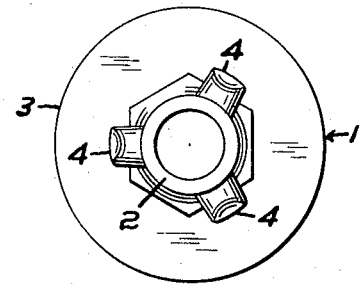
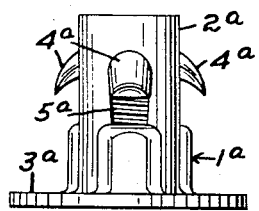
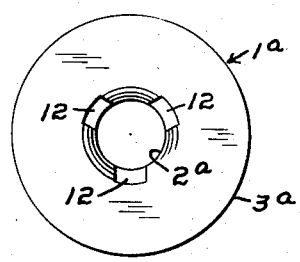
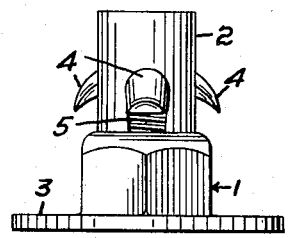
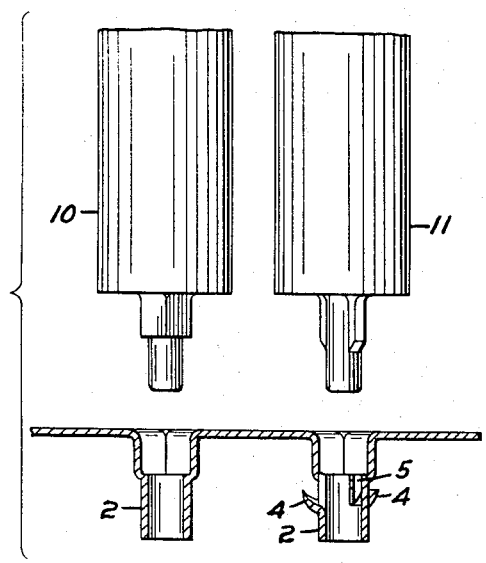
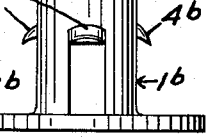
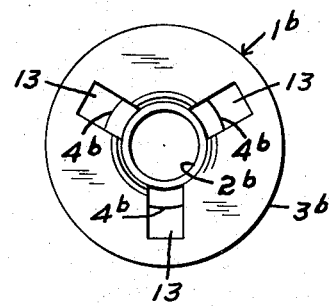
Inventor:
Norman J. Hughes,
by James R. O'Connor
Atty.

United States Patent Office 3,358,728
Patented Dec. 19, 1967

3,358,728
PRONGED NUT
Norman J. Hughes, Melrose, Mass., assignor to United-Carr Incorporated, Boston, Mass., a corporation of Delaware
Filed Mar. 3, 1966, Ser. No. 531,534
3 Claims. (Cl. 151—41.73)

ABSTRACT OF THE DISCLOSURE

A sheet metal nut having a barrel portion, an end flange, and a plurality of integral prongs formed from material skived from the barrel portion. The nut is particularly adapted for installation in a bore in a frame member of a furniture piece which is concealed at the time of fastening a second member to the frame member in that the prongs bitingly embed themselves in the wall of the bore and prevent the nut from being driven out of the frame member and becoming "lost" when a bolt is being turned into the nut.

---

The present invention relates generally to flanged nuts and more specifically to a flanged nut having a plurality of workpiece engaging prongs.

An object of the invention is to provide an inexpensive, easily installed and highly efficient pronged nut.

Another object of the invention is to provide a flanged nut having a plurality of integral prongs adapted to engage to the internal wall in a workpiece defining a bore therein to prevent the nut from being driven out of the workpiece when a bolt is turned into the nut from its end opposite the flange.

Another object of the invention is to provide a pronged nut which can be hopper-fed to a track for attachment to a workpiece using automatic attaching machinery.

Other objects and advantages of the novel nut construction will become evident from a reading of the following detailed description in conjunction with a viewing of the accompanying drawings, in which:

FIG. 1 is a sectional view of an installation depicting one form of the nut seated in the bore in a workpiece and cooperating with a bolt to secure a part to one surface of the workpiece;

FIG. 2 is a top plan view of the nut shown in FIG. 1 looking down in the end of the threaded barrel;

FIG. 3 is a side elevation of the nut shown in FIGS. 1 and 2;

FIG. 4 is a side elevation of an alternate form of the nut;

FIG. 5 is a bottom plan view of the nut shown in FIG. 4;

FIG. 6 is a side elevation of a second alternate construction of the nut;

FIG. 7 is a bottom plan view of the nut shown in FIG. 6; and

FIG. 8 is a diagrammatic representation of the method and tools employed to manufacture the nut shown in FIGS. 1, 2 and 3.

As best shown in FIGS. 2 and 3 the nut 1 includes an internally threaded barrel portion 2, a peripheral flange 3 extending outwardly from one end of the barrel portion 2 and a plurality of integral, dish-shaped prongs 4 which extend outwardly from the barrel portion and upwardly towards the flange 3. Since the prongs 4 were sheared from the barrel 2, the latter has an opening 5 adjacent each of the prongs. Each of the prongs has a generally concavo-convex configuration in transverse cross section and each is longitudinally tapered from its free end to provide a sharp leading edge on each prong. Further, that portion of the barrel between the openings 5 and the flange 3 is hexagonally shaped and has a width greater than the diameter of the remainder of the barrel.

FIG. 1 depicts an installation wherein the nut 1 is employed cooperatively with a bolt 6 to secure a part 7 to a fibrous workpiece 8 having a bore 9 extending therethrough. For a proper understanding of the utility of the invention, one should envision that the workpiece 8 is a frame member of an upholstered furniture piece, for example, a divan, that the nut 1 was assembled to the workpiece 8 prior to the upholstering of the divan and that at the time of assembly of the part 7 the upper surface of the workpiece 8 is inaccessible for all practical purposes. As the nut 1 is driven into the bore 9 in the workpiece 8, the prongs 4 form grooves by compressing the fibers with which they come in contact. This is the reason that the upper end of the bore shown in section in FIG. 1 appears to be of greater diameter than the lower end. Once the nut is fully seated, the fibers above the prongs tend to expand inwardly and the nut is retained in place by the biting action of the prongs 4. Thus the nut cannot become dislodged during the completion of fabrication of the furniture piece.

The second important function of the prongs 4 is to prevent the nut 1 from being driven out of the bore 9 when the bolt 6 is turned into the nut to attach the part 7 to the workpiece 8, particularly when a power tool is employed to drive the bolt. As readily observed in FIG. 1 a force applied against the end of the wall of the barrel 2, resulting from misalignment of the bolt and the nut when the driving tool is energized, will be resisted by the prongs 4 which will penetrate further upwardly into the workpiece. Thus, the nut will not be driven out of the bore so as to become in effect "lost" in the interior of the furniture piece. The reader will appreciate that in mass production furniture assembly the "lost nut" results in costly and rather exasperating delays. Of course, once the threaded nut and bolt properly mate, the nut is drawn into the bore 9 until the flange 3 is pulled against the upper surface of the workpiece 8.

For applications such as that depicted and described above, the persent invention represents a substantial improvement over devices such as that disclosed in U.S. Patent No. 2,818,901 (P.D. Becker et al.) which device embodies straight piercing prongs attached to the flange, which prongs may be driven out of the workpiece responsive to a force exerted on the end of the barrel, and other devices which are devoid of retaining means to prevent axial movement of the nut when a bolt is applied thereto. In addition, the invention represents an improvement over nuts charcterized by the Becker et al. patent since it can be hopper-fed to a track for attachment to a workpiece using automatic attaching machinery. Obviously, in the Becker et al. device, the prongs extending from the end flange would prohibit the proper seating of the nut in a track.

The method of forming the nut described above is depicted in FIG. 8. The hexagonal upper portion of the barrel is first formed by driving the punch 10 into a drawn barrel of constant diameter throughout. Thereafter the punch 11 having a plurality of radial, wedge-like cutters is pressed into the barrel. The longitudinal surfaces of the cutters abut the internal wall of the enlarged portion of the barrel and as the punch bottoms the cutters engage the lower barrel wall to shear the prongs 4 therefrom. Thereafter the lower portion of the barrel is tapped and the flange 3 is formed by succeeding tools not shown. During each of the above-described operations the blank is, of course, supported by suitable dies.

The alternate form of the invention shown in FIGS. 4 and 5 is essentially the same as that described above, except that the end of the barrel adjacent the flange does not have an enlarged hexagonal shape. Rather, it has been embossed outwardly to form grooves 12 spaced to correspond to the spacing of the cutters on the tool 11. Further the internal wall of the barrel portion 2a between the groves 12 is threaded throughout its length.

The device shown in FIGS. 6 and 7 functions in the same manner as the previously described forms of the invention, however, it is formed in quite a different manner. That is, the flange 3b is provided with a plurality of spaced openings 13 extending radially from the barrel 2b, and the prongs 4b are formed by skiving material from the outer surface of the barrel 2b using a tool (not shown) having spaced blades positioned to register with the openings 13.

Thus, while three variations of the novel nut have been disclosed for purposes of illustration, it is to be clearly understood that the disclosure is not to be interpreted in a limiting sense in that the scope of the invention is best defined by the following claims.

I claim:

1. A sheet metal nut comprising a barrel portion adapted to be axially driven into a through bore in a workpiece, a workpiece-engaging flange disposed at one end of said barrel portion and a plurality of integral prongs partially sheared from and disposed about the periphery of said barrel portion intermediate the length thereof and having free ends extending toward said flange, said nut having a plurality of through openings formed therein each of which is generally aligned with one of said prongs, said barrel portion having a section of lesser extending diameter than other sections thereof immediately adjacent each of said openings, said prongs having been sheared from said section of lesser diameter and having a generally concavo-convex configuration in transverse cross section and being longitudinally tapered from said barrel portion to said free ends to provide sharp leading edges which bitingly engage the wall of the bore to prevent the nut from being pushed out of the bore when a bolt is turned into the nut from the end of the bore opposite said flange.

2. A sheet metal nut comprising a barrel portion adapted to be axially driven into a through bore in a workpiece, a peripheral, workpiece-engaging flange disposed at one end of said barrel portion and a plurality of workpiece-engaging prongs disposed about the periphery of said barrel portion intermediate its length, said prongs being integrally joined to said barrel portion and having free ends extending angularly toward said flange, said barrel portion having a radially enlarged secton adjacent said flange and a plurality of openings extending from said enlarged section to the non-free ends of said prongs, said openings having been formed by the shearing of said prongs from said barrel portion, said prongs having a generally concavo-convex configuration in transverse cross section and being longitudinally tapered from said barrel portion to said free ends to provide sharp leading edges which bitingly engage the wall of the bore and prevent the nut from being driven out of the bore when a bolt is turned into the nut from the end of the bore opposite said flange.

3. A sheet metal nut comprising a barrel portion adapted to be axially driven into a through bore in a workpiece, a peripheral, workpiece-engaging flange disposed at one end of said barrel portion and a plurality of workpiece-engaging prongs disposed about the periphery of said barrel portion intermediate its length, said prongs being integrally joined to said barrel portion and having free ends extending angularly toward said flange, said flange having a plurality of openings formed therein and extending radially outwardly from adjacent said barrel portion and in alignment with each of said prongs, said prongs having a generally concavo-convex configuration in transverse cross section and being longitudinally tapered from said barrel portion to said free ends to provide sharp leading edges which bitingly engage the wall of the bore and prevent the nut from being driven out of the bore when a bolt is turned into the nut from the end of the bore opposite said flange.

References Cited

UNITED STATES PATENTS

| | | | |
|---|---|---|---|
| 874,611 | 12/1907 | Montimore | 151—41.73 |
| 1,774,846 | 9/1930 | Rosenberg | 85—21 |
| 2,055,443 | 9/1936 | Jones | 151—41.73 |
| 2,462,010 | 2/1949 | Spender | 151—41.73 |
| 2,672,659 | 3/1954 | Becker | 151—41.7 |
| 3,092,162 | 6/1963 | Johnson | 151—41.73 |

EDWARD C. ALLEN, *Primary Examiner.*

UNITED STATES PATENT OFFICE

CERTIFICATE OF CORRECTION

Patent No. 3,358,728      December 19, 1967

Norman J. Hughes

It is hereby certified that error appears in the above numbered patent requiring correction and that the said Letters Patent should read as corrected below.

Column 3, line 30, for "extending" read -- external --; lines 42 and 43, for "disposited" read -- disposed --.

Signed and sealed this 6th day of May 1969.

(SEAL)
Attest:

Edward M. Fletcher, Jr.
Attesting Officer

Commissioner of Patents